Patented Aug. 19, 1947

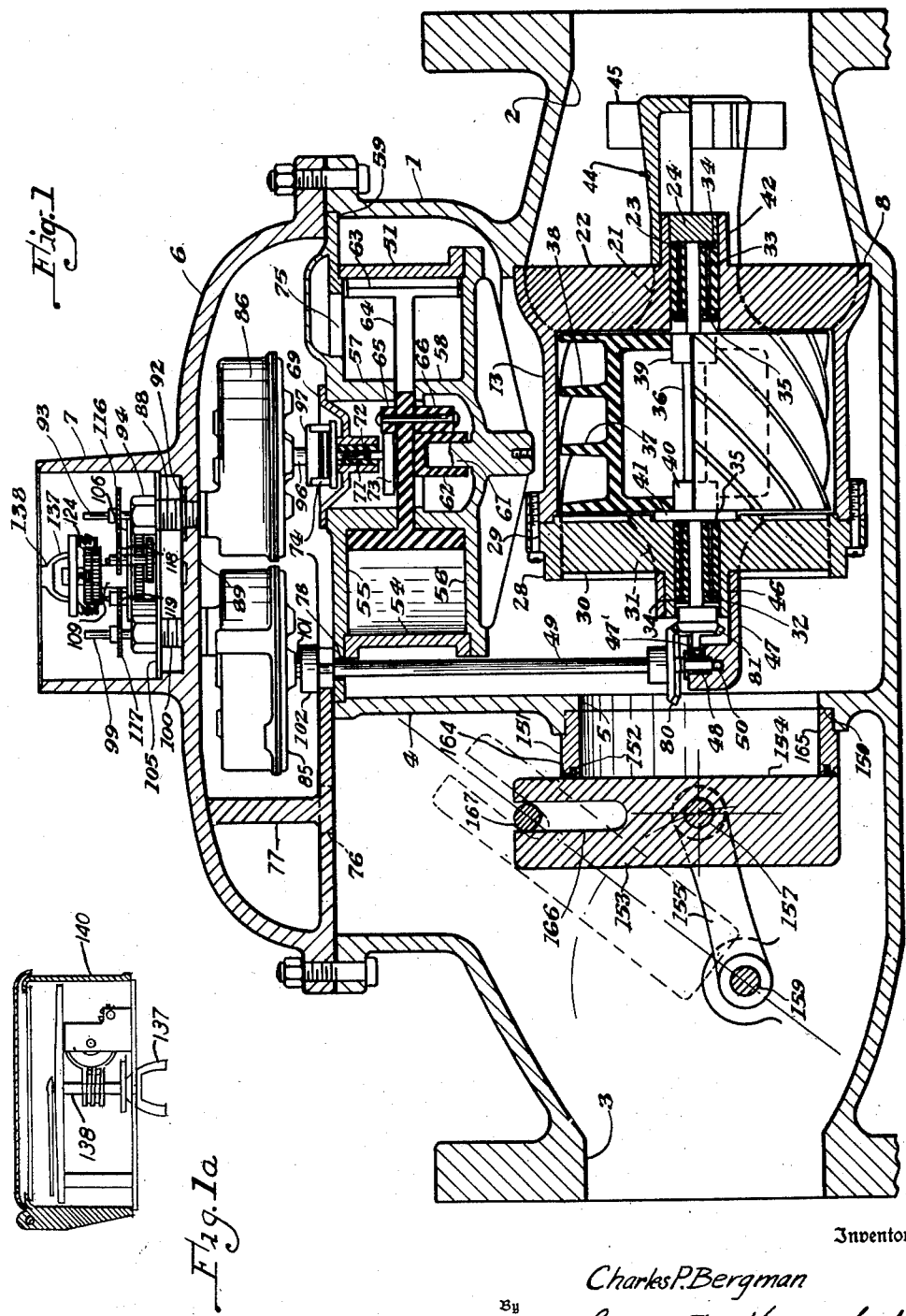

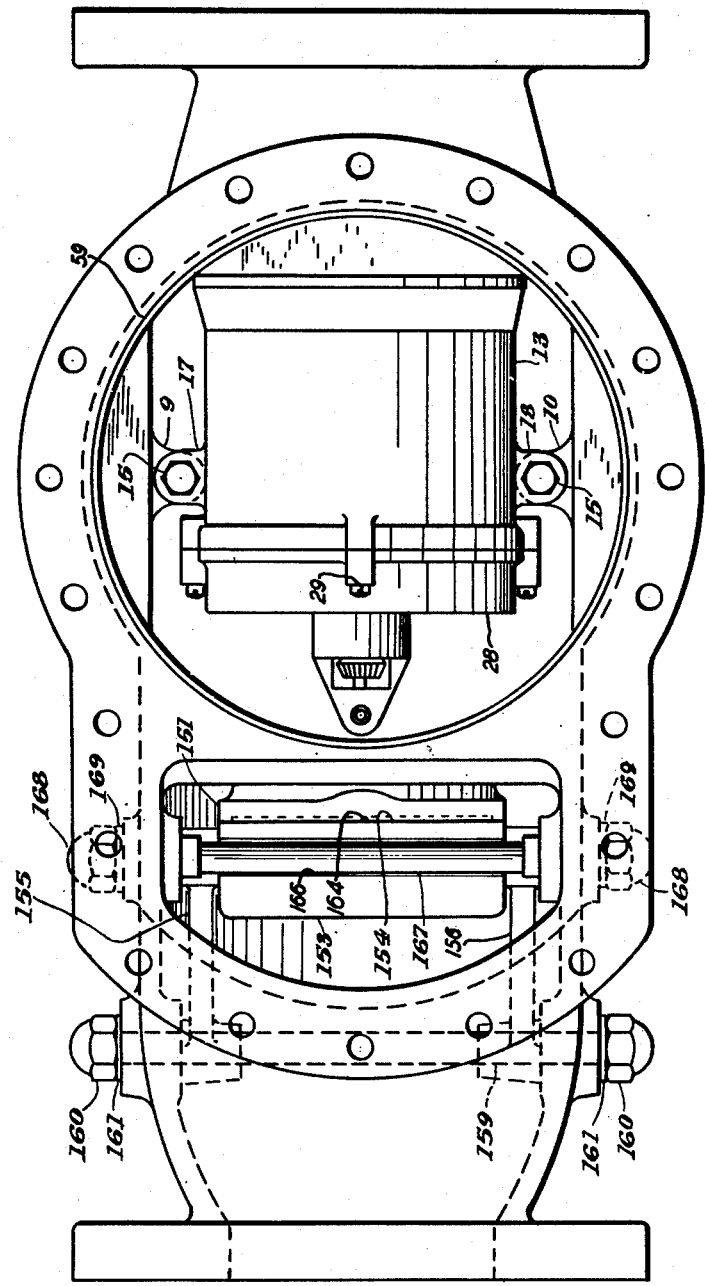

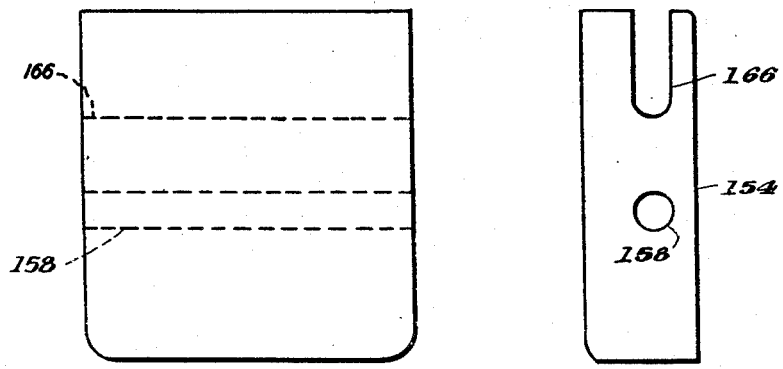
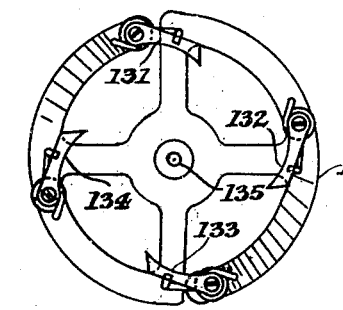
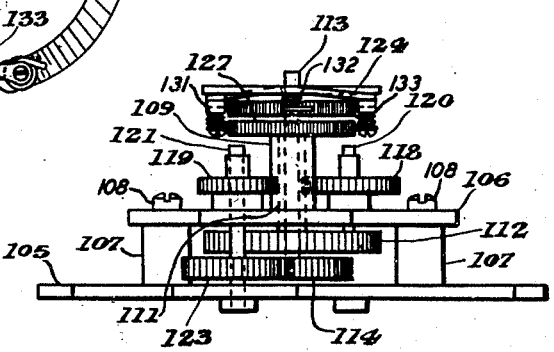

2,425,720

UNITED STATES PATENT OFFICE 2,425,720

COMPOUND METER

Charles P. Bergman, Brooklyn, N. Y., assignor to Rockwell Manufacturing Company, a corporation of Pennsylvania Application November 4, 1943, Serial No. 508,888

14 Claims. (Cl. 73—197)

1

The present invention relates to meters for the measurement of fluid, and relates particularly to the type of meters known as compound meters wherein a small meter is employed for measuring small flows, and a large meter is employed for measuring large flows beyond the capacity of the small meter.

It is an object of the present invention to provide a compound meter in which there is provided a large flow meter and a small flow meter in series, with a valve controlled bypass around the small flow meter, so that the flow at all times passes through the large flow meter.

Another object is the provision in a compound meter having a large flow meter and a small flow meter in series, of a valve located on the downstream side of the high rate of flow meter and controlling the flow therethrough, and a common register provided to be driven by a suitable clutch drive so that the faster moving meter drives the register.

A further object is the provision in a compound meter, of a valve which does not reduce flow of the measured fluid passing through said large meter when the valve is fully opened by that fluid.

A further object is the provision of a compound meter in which the working parts are so arranged as to be readily removable from the housing without removing the housing from the line in which it is connected.

A further object is the provision of a compound meter in which the accuracy at the change over point is not impaired.

A further object of the invention is to provide a meter valve construction wherein a valve closure member is opened and moved to fully open position by fluid flow through the meter, the valve closure member being mounted in a novel manner so that a greater force is needed to open it than is sequentially required to move it to fully open position.

A further object is the provision in a compound meter of a valve which is opened by a gradually decreasing force.

Another object is the provision of a compound meter which is of simple construction, is compact and of lesser weight than those heretofore constructed, and which has an increased flow capacity.

In accordance with the present invention, I provide a compound meter having a large flow meter and a small flow meter in series therewith, a valve on the downstream side of the large flow meter which controls a bypass and opens when

2 a predetermined rate of flow is attained so as to allow substantially the full volume to be measured by the large flow measuring device. This valve is preferably of a type which may move to a fully open position where it does not obstruct flow through the large flow meter. The valve is arranged so that in closed position a greater force is required to open the valve than after the valve is slightly cracked, and the force necessary to further open the valve decreases as the valve opening increases. In this arrangement I provide a single register driven through a suitable one way drive arrangement by either the large flow meter or the small flow meter, whichever is moving faster.

The invention will be described in greater detail in connection with the accompanying drawings wherein is illustrated a preferred embodiment of the invention by way of example, and wherein Figure 1 is a vertical section through the meter with certain parts illustrated in elevation, Figure 1a is a vertical sectional view of a preferred form of register, Figure 2 is a top view of the meter with the top cover and small meter removed, Figure 3 is an elevation of the valve as viewed from the left in Figure 1, Figure 4 is a side view of the register drive mechanism, Figure 5 is a side view of the valve, and Figure 6 is a bottom view of the pawl wheel of the register drive mechanism.

Referring to the drawing there is shown a casing comprising a lower part 1 having an inlet passageway 2, an outlet passageway 3, and a dividing wall 4 therebetween having an orifice 5 therein, and a cover 6 for the casing having an extension 7. The body has an internal shoulder 8 surrounding the inlet 2 and suitably apertured lugs 9 and 10 (Fig. 2) extend from the interior of the casing. A cylindrical impeller housing 13 is located in the casing 1 with one end seated on the shoulder 8, and is held in position by bolts 15 extending through apertured lugs 17 and 18 on the outside of the housing 13, and threaded into the lugs 9 and 10. The impeller housing has a middle hub 21 supported by radial ribs or spokes 22, the hub being bored to receive a roller bearing unit 23 of suitable construction, and which bore has its outer end closed by a plug 24 having a pressed fit. The opposite end of the impeller housing has a cylindrical extension 28 secured thereto in any suitable manner, as by screws 29, and has ribs or spokes 30 rounded on the forward edge and which carry a hub 31, that is bored to receive a suitable roller bearing 32.

The roller bearings 23 and 32 comprise hard rubber rollers on spindles 33 suitably secured in end plates 34 and 35 received in the respective hubs, and an impeller shaft 36 is journalled therein and carries an impeller 37. The impeller is of hollow construction and has on its exterior the helical vanes 38. An enlargement 39 on the impeller shaft is received in a suitable centering bore in the forward impeller end, and a similar enlargement 40 at the opposite end is received in a similar bore in the rear impeller head, the shaft being secured to the impeller by screws (not shown) passing through flange 41 into the impeller head. A suitable clearance is provided between the rear of the impeller and the rear spokes 30 to prevent a suction effect. The forward hub 21 has a reduced portion 42 adapted to receive a head 44 carrying straightening vanes 45 which are designed to direct incoming fluid at a uniform angle against the helical vanes 38. The hub 31 has a reduced portion 46 which receives a collar 47 suitably locked against rotation as by a set screw, and having an extension with a horizontal bore therein to receive the end of shaft 36 and a ball 47' therein takes the end thrust of the shaft. This member also has a vertical bushed bore 48 which receives a shaft 49 and a ball 50 takes the end thrust of the latter shaft.

Within the upper portion of housing 1 is mounted a positive type measuring member 51, there being a relatively large space below the meter to reduce the velocity of the fluid. This measuring member preferably is of the oscillating piston type, and comprises a chamber formed by a middle cylindrical portion 54 and cover plates 55 and 56 having cylindrical extensions 57 and 58 about their centers, the top plate being received by a shoulder 59 in the casing, and the cover 6 holds the measuring member in place. The lower cover has a middle boss 61 receiving a thrust roller 62 and a piston is located in the chamber and comprises a cylinder 63 having a middle slotted membrane 64 and stems 65 and 66 secured at its center; the lower stem 66 being engaged by the roller 62 is guided thereby for oscillation in the chamber, a suitable division plate being provided. A central bearing and sealing member 69 is suitably secured and sealed in the top plate of the measuring chamber and contains a bushing 71 in which is journalled a stem 72 carrying the dog 73 at its bottom which is engaged and driven by the upper stem 65, and stem 72 has a crank member 74 at its top. Fluid enters the meter 51 through a suitable inlet opening (not shown) in the bottom plate 56, and a shielded outlet opening 75 is provided in the top plate 55 whereby fluid enters cover 6 after it is measured and passes to the outlet through one or more openings 76 in the bottom plate of the cover which may be used to limit the rate of flow through the meter 51. A post 77 reenforces the cover plate 6. This metering unit is further disclosed in detail in the Whittaker Patent No. 2,338,152, January 4, 1944. The size or area of the opening or openings 76, by controlling the rate of flow through meter 51, governs the differential pressures which in turn control the operation of the valve to be presently described.

The upper head 55 of the measuring chamber has a bore 78 outside of the measuring chamber of meter 51 which is suitably bushed and sealed and in which is journalled the upper end of shaft 49. This shaft carries a miter gear 80 which meshes with a miter gear 81 on the impeller shaft 36.

Within the cover member 6 at the top is located reduction gear housings 85 and 86. Housing 86 has a threaded extension 88 passing through the bottom 89 of the register drive compartment 7 and is held in place by a lock nut 92 threaded thereon. This extension serves as a stuffing box through which extends the last spindle 93 of the gear train and which is sealed by suitable stuffing compressed by gland 94. The first spindle 96 of the gear train carries a dog 97 which is engaged and driven by crank member 74. The housing 85 is similarly secured in place with its final spindle 99 passing through a stuffing box 100 and its first spindle 101 suitably coupled to shaft 49 by a self aligning separable coupling 102 of suitable construction.

A coordinator comprises a base plate 105 having a plate 106 secured in spaced relation thereto by spacers 107 and screws 108. A central bearing member 109 is carried by the upper plate 106 and receives a hollow shaft 111 with a gear 112 on the lower end thereof, and a shaft 113 is journalled in the hollow shaft and carries a gear 114 at its lower end. Spindles 93 and 99 carry gears 116 and 117 respectively which mesh with and drive gears 118 and 119 on shafts 120 and 121 suitably journalled in plates 105 and 106. Shaft 121 carries at its lower end a gear 123 which meshes with gear 114 on shaft 113, and a ratchet wheel 124 is carried at the upper end of shaft 113. Shaft 120 carries at its lower end a gear (not shown) which meshes with gear 112 on hollow shaft 111, and a ratchet wheel 127 is carried at the upper end of shaft 111. A frame 130 carries a plurality of spring pressed pawls 131, 132, 133 and 134, and has a centrally bushed opening 135 in which is received the end of shaft 113 whereby the frame is positioned with one pair of pawls 131, 133 engaging the lower ratchet wheel 127 and the other pair of pawls 132, 134 engaging the upper ratchet wheel 124. Any desired number of pawls may be employed, and it will be seen that by this arrangement the frame 130 will be driven by whichever ratchet 124 or 127 is rotating faster. A suitable dog 137 on a shaft 138 engages the arms of the frame 130 to be driven thereby and drives a register 140 suitably secured to cover 6.

The operation of the apparatus so far described will now be explained. Fluid entering the inlet 2 is directed by the straightening vanes 45 against the helical vanes 38 of the impeller to rotate the impeller member 37, this rotation being transmitted by shaft 36, mitre gears 81 and 80 to shaft 49, and through coupling member 102 and through the gear train in casing 85 to the spindle 99. Fluid that passes the impeller 37 passes upward through the positive meter 51 and discharges from the exit opening 75 into the cover member 6 and continues through openings 76 to the outlet side of the housing, and in doing so oscillates the piston in the meter whereby stem 65 rotates shaft 72, which through the coupling 74, 97 operates the gear train in housing 86 to drive the spindle 93. It is assumed that the orifice 5 is closed and thus all the flow passes through the chamber 13 and the positive meter 51. Assuming the amount of flow is so small that the rotation of impeller 37 will not bear an accurate relationship thereto, the meter 51 will accurately measure the flow therethrough, and the register driving shaft 138 will be driven by the faster moving ratchet wheel 127, the gearing relationship between the two metering elements being suitably selected for this purpose.

The opening 5 provides an internal shoulder or step 150 to receive a flanged seat member 151 having a circular insert 152, of suitable material such as "neoprene," to form a seat. A valve member 153, in the form of a rectangular plate accurately machined on its interior face 154, is adapted to engage the seat 152 and is held in position by arms 155 and 156 secured to the ends of a spindle 157 passing through a suitable bore 158 in the valve member, and at their opposite ends the arms are journalled on a spindle 159 passing through the housing and held in position by nuts 160 and sealing washers 161. The valve member may be inserted from the top of the casing. The center of spindle 157 preferably coincides substantially with the horizontal axis of the bore 165 in the valve seat member 151 or is slightly above, and the arms 155 and 156 are of greater length than the horizontal projected distance between the shafts 157 and 159 when the valve is in closed position. The center of shaft 157 preferably is forward of a median plane parallel to the side faces of the valve member. Thus the weight of the valve develops a horizontal force component causing the arms 155 and 156 to constantly urge the valve member on its seat, the seating pressure of the valve being augmented by having the greater portion of the valve mass above shaft 157. The "neoprene" insert 152 projects beyond the end face 164 of the seat member 151 to eliminate metal to metal contact between the valve 153 and said seat member. The small area of contact between the valve and insert 152 avoids the possibility of a retarded opening of the valve with a small clearance between the valve and member 151 which would result in a high velocity of flow with a suction effect, tending to cause chatter and delayed opening of the valve.

The upper end of the valve member has a slot 166 which receives a guide spindle 167 extending through the casing and held in place by nuts 168 and sealing washers 169. This spindle 167 and guide slot 166 are arranged so that arms 155 and 156 may hold the valve against its seat, the required play being provided between spindle 167 and slot 166 to allow proper seating of the valve. The distance between shafts 159 and 167 is greater than the distance between shafts 159 and 157, and when the pressure of incoming fluid is sufficient to slightly open the valve, arms 155 and 156 commence to rotate about their pivot 159 as indicated by the dot and dash line, to pivot valve member 153 about shaft 167 as a sliding pivot to open the valve slightly. In effect the valve member mounting provides a toggle biased by the weight of the valve, and after the pivot points 159, 157, and 167 pass through the alignment position, which is approximately 45° from the vertical, a progressively decreasing force is required to further open the valve. This is due to the fact that the angular relationship of the valve to the applied force is constantly changing owing to the unbalanced mounting of the valve between the arms 155 and 156 and its sliding pivotal support at 167. When the valve reaches the fully open position the housing 1 acts as a stop by engaging the corners of the valve, and it is substantially horizontal and will not reduce with the flow of fluid from orifice 5 to the outlet 3.

The operation of the complete apparatus now will be described. Assuming a small flow of liquid, the valve 153 will be in closed position, and all the liquid will pass through the impeller 37 to rotate it, and will pass upwardly through the positive meter 51 to oscillate the impeller or piston thereof and ratchet wheel 127 will drive the register. The impeller 37 and shaft 49 will not drive the register because the ratchet 124 driven thereby is moving at a slower rate of speed than ratchet 127. When the flow increases in volume to the extent that the impeller 37 can accurately measure the flow, and the flow is still below the maximum capacity of the positive meter 51, the ratchet wheels 124 and 127 will be driven at substantially the same speed and the register then may be regarded as being driven by both meters, although if there is a slight difference in accuracy of measurement between the two meters, the faster moving ratchet will drive the register. If the flow still further increases the valve 153 will be opened to allow the liquid to flow directly to outlet 3. This movement of valve 153 occurs when the rate of flow is such that impeller 37 will accurately measure the flow, and that part of the flow which passes through the positive meter 51 will not affect the accuracy of registration because all the liquid flows through the impeller 37 before it enters the meter 51. The force required to move valve 153 from closed position is the liquid pressure head of predetermined value. Thereafter, the changing lever arm and the weight of the valve above pivot 167 assist in opening the valve further, and after the aligned pivot position is reached it requires only a comparatively slight fluid pressure to move the valve to substantially horizontal position where it will not reduce the flow between the inlet and outlet.

It will be noted that at the changeover point where the positive meter 51 ceases to measure the full flow, there is no change in accuracy because the full flow always passes through the impeller 37 and once the flow has reached that rate where impeller 37 will accurately measure it, there is considerable leeway for timing the opening of valve 153, because there is an overlap of the accurate capacities of the positive meter 51 and the impeller 37. There is thus provided a compact structure in which the low volume and high volume meters are combined in a single housing connected into the flow line so that all the parts may readily be removed without taking the casing out of the flow line, and the loss of head through the meter is decreased. The impeller is mounted in hard rubber roller bearings which are lubricated by the liquid being measured and as the impeller axis is in horizontal position no change in the direction of flow of the liquid in the housing is required until after the liquid has passed through the impeller.

The mounting and arrangement of the large and small meters with the register drive mechanism in closely superposed relation is a very important practical feature of the invention. With the small flow meter unit directly above the large flow unit, a common housing structure of simple design can be utilized, providing a very compact assembly of minimum size and weight. This results in economical use of materials with maximum ease and facility of installation. It also directly contributes to a greatly simplified connection between the meter units and the registering mechanism involving only the use of a single set of beveled gears, materially simplifies the internal passageways to allow free flow of the liquid through the meters with minimum restriction, and facilitates rapid production with a corresponding reduction in cost.

What I claim as my invention and desire to secure by United States Letters Patent is:

1. In a fluid meter, a housing having a passageway for flow of fluid and inlet and outlet connections, an impeller for measuring large flows mounted in said passageway, a valve seat surrounding said passageway, a valve member to cooperate with said seat to close said passageway, means movable relative to the valve seat pivotally supporting and urging the valve member into contact with the seat, relatively stationary means directly coacting with said valve member in the movement of said movable means in one direction to cause pivotal movement of the valve member relative to said movable means to full open position in response to predetermined fluid pressure on said valve member, and a bypass around said valve member, a small flow positive displacement meter in said bypass, a register, and means selectively driving said register by either of said meters.

2. In a fluid meter, a housing having a passageway for flow of fluid and inlet and outlet connections, an impeller for measuring large flows mounted in said passageway, a valve seat surrounding said passageway, and a valve member adapted to cooperate with said seat to close said passageway, means providing a sliding pivotal support for the valve member, pivoted means for guiding the valve member about said latter means, a bypass around said valve member, a small flow positive displacement meter in said bypass, a register, and an overrunning one way drive connecting said register with said displacement meter and said impeller.

3. In a fluid meter, a housing having a passageway for flow of fluid and inlet and outlet connections, an impeller for measuring fluid flows mounted in said passageway, a valve orifice providing a seat surrounding said passageway, a valve member adapted to cooperate with said seat to close said passageway, a link pivoted at one end to the housing and at its other end pivoted to the valve member, and a sliding pivotal support for said valve member located above the center of gravity thereof.

4. In a compound fluid meter assembly, a large flow meter and a small flow meter in successive fluid communication, an inlet for said compound meter assembly connected to said large flow meter only, a valve aperture substantially aligned with the discharge end of said large flow meter adapted to pass fluid therefrom to an outlet for said compound meter assembly, means for discharging fluid from said small flow meter to said outlet independently of said valve aperture, a valve member for closing said aperture, and a toggle pivot mounting for said valve member to enable the latter to swing to fully open position where it will not reduce flow of fluid through said aperture, said mounting initially opposing opening movement of the valve member with considerable force and then opposing said opening movement with less force as the valve is opened.

5. In a fluid meter having an inlet, a flow meter and a valve opening in substantial alignment, a substantially vertical seat about said valve opening, a fluid pressure responsive valve member having a substantially planar vertical face adapted to contact said seat when the valve is in closed position, and a toggle mounting for said valve member biased by the weight of said valve member and providing lessening resistance to opening of the valve by fluid flow after said valve member has moved a predetermined amount.

6. In a fluid meter having an inlet, a flow meter and a valve opening in substantial alignment, a substantially vertical seat about said valve opening, a fluid pressure responsive valve member having a substantially planar vertical face adapted to contact said seat when the valve is in closed position, an arm having a fixed pivot adjacent one end and pivotally connected to said valve member adjacent its other end, and a slide pivot for said valve member about which said member is moved in response to fluid flow.

7. In combination with a conduit and a fluid flow metering device associated therewith, a normally closed fluid pressure responsive valve mechanism at the eduction side of the metering device comprising a valve seat substantially perpendicular to the line of fluid flow, a valve member, and means directly connected with and supporting said valve member for bodily displacement from the valve seat in response to fluid pressure of predetermined value and for concurrent rectilinear and pivotal movement with respect to said seat under progressively diminishing fluid pressure to a fully opened position where it does not reduce flow of fluid through said valve.

8. The combination defined in claim 7, in which said means includes a rocker member and means mounting said valve member in unbalanced position on said rocker member, together with slidably coacting parts on the valve member and the conduit, controlling rectilinear and pivotal movement of said valve member.

9. The combination defined in claim 7, in which said means includes a rocker arm having a fixed fulcrum at one of its ends and pivotally connected with the valve member at its other end to urge said valve member by the weight thereof to closed position on said valve seat.

10. In a fluid flow metering device, a normally closed fluid pressure responsive valve mechanism at the eduction side of the metering device comprising a valve seat, a valve member normally engaged with said valve seat, and means responsive to predetermined fluid pressure on said valve member to accelerate movement thereof to full open position, said means comprising valve supporting means rockable about a fixed fulcrum spaced from the valve seat in the direction of fluid flow and pivotally connected to the valve member, and means adjacent to the valve seat slidably coacting with a part of said valve member in the movement thereof toward open position to progressively shift the center of gravity of the valve member toward the valve seat and change the angular position of said member relative to said rockable means and the line of fluid flow, whereby movement of said valve member to full open position under diminishing fluid pressure is accelerated.

11. In a fluid meter assembly, means defining a passageway for flow of fluid, a valve seat surrounding said passageway, a movable valve member adapted to coact with said seat to close the passageway and movable in response to predetermined fluid pressure and continued fluid flow in said passageway to a fully open position where it does not reduce fluid flow through said seat, means movable relative to the valve seat pivotally supporting and urging the valve member into contact with said seat, and means in fixed relation to said valve and passageway directly coacting with said valve member in the movement of said movable means in one direction to cause pivotal movement of the valve member relative to said movable means and said fixed means toward said open position in response to said predetermined fluid pressure on said valve member.

12. Fluid meter structure having a valve seat defining a fluid passage, a normally closed valve member contacting said seat, means fixed to said structure adjacent to the valve seat and coacting with means on said valve member to slidably guide said member, a valve supporting element movably mounted directly on said structure, and means directly connecting said movable element to said valve member to support said member for angular movement relative to said movable element and the fixed guide means away from the valve seat and cooperating with said guide means to accelerate movement of said valve member relative to said movable element to full open position in response to fluid pressure of predetermined value.

13. Fluid meter structure as defined in claim 12, wherein said movable element comprises a toggle link movable at one of its ends on said structure about a fixed pivot and pivotally supporting said valve member in unbalanced position on its other end, with the major part of the valve mass extending between said link and fixed guide member.

14. In a fluid meter having a passageway, valve means for said passageway including a valve seat, a valve member having a face adapted to contact with said seat when the valve is closed, an arm pivoted on a relatively stationary axis and inclined upwardly and towards said valve member in the closed position of the latter and pivotally connected to said valve member at a point which locates the greater part of the valve member mass above said pivotal connection, whereby the valve weight causes said arm to urge said valve member to closed position on said seat and resists opening movement thereof under fluid pressure below a predetermined value, and a fixed guide adjacent the valve seat slidably and pivotally engaged by said valve member above its point of pivotal connection to said arm, said valve member being opened in response to a predetermined fluid pressure, and said valve member and arm during opening movement of the valve passing through a dead center position where the pivot axes of said arm and valve are substantially aligned with said fixed guide, the weight of said valve member being thereafter distributed between said fixed guide and said arm to accelerate further opening movement of the valve member under diminishing fluid pressure.

CHARLES P. BERGMAN.

REFERENCES CITED

The following references are of record in the file of this patent:

UNITED STATES PATENTS

| Number | Name | Date |
|---|---|---|
| 934,504 | Connet | Sept. 21, 1909 |
| 1,057,721 | Freeman | Apr. 1, 1913 |
| 1,411,258 | Anderson | Apr. 4, 1922 |
| 1,576,712 | Bold et al. | Mar. 16, 1926 |
| 1,725,428 | Tilden | Aug. 20, 1929 |
| 1,331,159 | Lambert | Feb. 17, 1920 |
| 2,270,141 | Potter | Jan. 13, 1942 |
| 1,142,141 | Burton | June 8, 1915 |

FOREIGN PATENTS

| Number | Country | Date |
|---|---|---|
| 304,837 | Great Britain | Jan. 31, 1929 |
| 541,726 | Germany | Jan. 15, 1932 |
| 432,192 | Germany | July 29, 1926 |